(12) United States Patent  
Brown et al.

(10) Patent No.: US 9,079,455 B2  
(45) Date of Patent: Jul. 14, 2015

(54) WHEEL COVER

(75) Inventors: Brian Brown, Peekskill, NY (US);  
Jakob deVries, Palatine, IL (US);  
Douglas E. Brown, Peekskill, NY (US)

(73) Assignee: Jake DeVries, Palatine, IL (US)

( * ) Notice: Subject to any disclaimer, the term of this patent is extended or adjusted under 35 U.S.C. 154(b) by 536 days.

(21) Appl. No.: 13/473,730

(22) Filed: May 17, 2012

(65) Prior Publication Data

US 2012/0234446 A1 Sep. 20, 2012

Related U.S. Application Data

(63) Continuation-in-part of application No. 13/225,196, filed on Sep. 2, 2011, now abandoned.

(60) Provisional application No. 61/379,623, filed on Sep. 2, 2010.

(51) Int. Cl.
| | |
|---|---|
| *B60C 7/24* | (2006.01) |
| *B60B 7/08* | (2006.01) |
| *A63C 17/22* | (2006.01) |
| *A63C 17/01* | (2006.01) |

(52) U.S. Cl.  
CPC . *B60B 7/08* (2013.01); *A63C 17/22* (2013.01); *A63C 17/01* (2013.01); *B60B 2200/47* (2013.01); *B60B 2900/321* (2013.01); *B60B 2900/3316* (2013.01); *B60Y 2200/81* (2013.01)

(58) Field of Classification Search  
CPC ........ B60C 27/06; B60C 27/16; B60C 27/18; B60C 7/24

USPC .............. 152/167, 170, 173, 175, 185, 185.1, 152/213 R, 216, 239, 251, 267; 206/304; 118/505; 150/166

See application file for complete search history.

(56) References Cited

U.S. PATENT DOCUMENTS

| | | | | |
|---|---|---|---|---|
| 1,753,519 | A * | 4/1930 | Kanner | 301/37.105 |
| 2,906,312 | A * | 9/1959 | Freedlander | 152/323 |
| 3,883,180 | A * | 5/1975 | Kain | 301/5.306 |
| 5,522,621 | A * | 6/1996 | Schneider | 280/825 |
| 5,590,935 | A * | 1/1997 | McAllister | 301/37.11 |
| 6,428,112 | B1 * | 8/2002 | Passoth et al. | 301/37.42 |
| 2003/0189333 | A1 * | 10/2003 | Chen | 280/809 |
| 2004/0217644 | A1 * | 11/2004 | Gallagher et al. | 301/5.308 |
| 2005/0179310 | A1 * | 8/2005 | Miller | 301/5.308 |
| 2006/0011281 | A1 * | 1/2006 | Roca et al. | 152/216 |
| 2007/0035174 | A1 * | 2/2007 | Paulovits | 301/37.25 |
| 2009/0140570 | A1 * | 6/2009 | Houkal | 301/1 |

* cited by examiner

*Primary Examiner* — S. Joseph Morano  
*Assistant Examiner* — Jean Charleston  
(74) *Attorney, Agent, or Firm* — Adam K. Sacharoff; Much Shelist

(57) ABSTRACT

A skateboard wheel cover includes a circumferential lip, an inner surface connected to an inner portion of the circumferential lip, and an outer surface connected to an outer portion of the circumferential lip. The outer surface is a material with a durometer different than a durometer of the wheel. The cover further includes at least a first attachment device configured to selectively attach to a skateboard wheel.

3 Claims, 6 Drawing Sheets

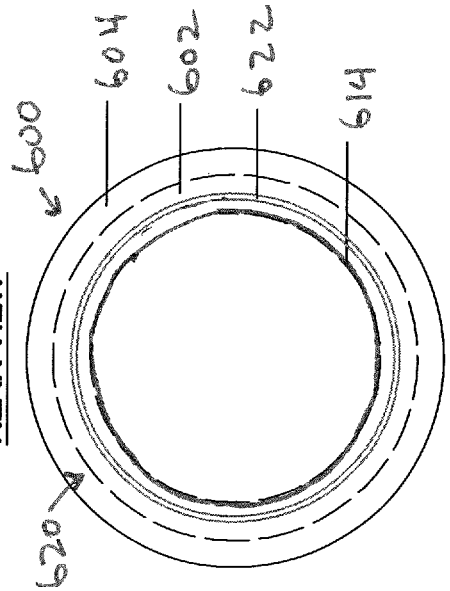
Fig 9B REAR VIEW
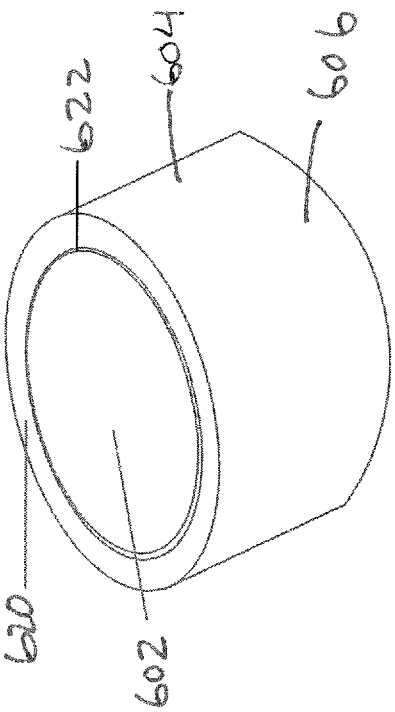
Figure 9D REAR SLANT VIEW
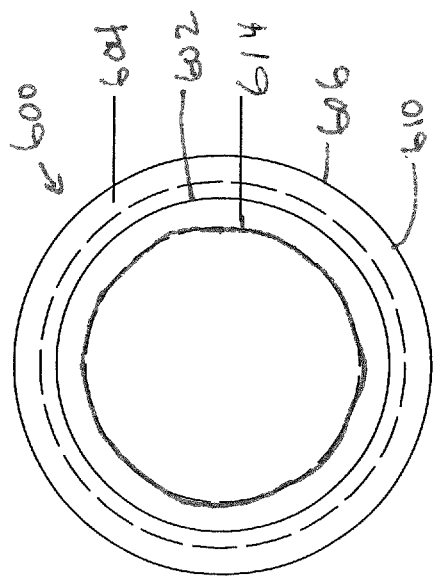
Fig 9A FRONT VIEW
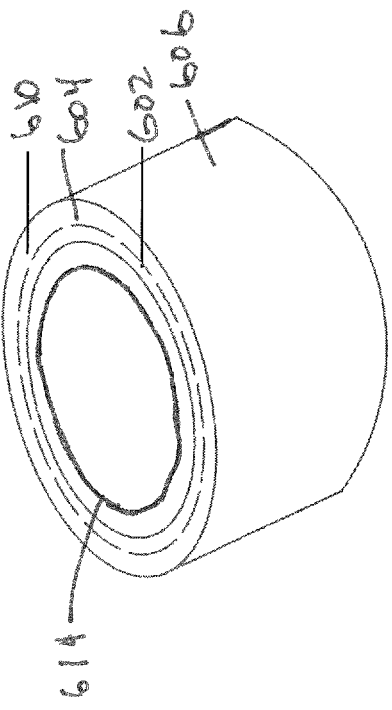
Fig 9C FRONT SLANT VIEW

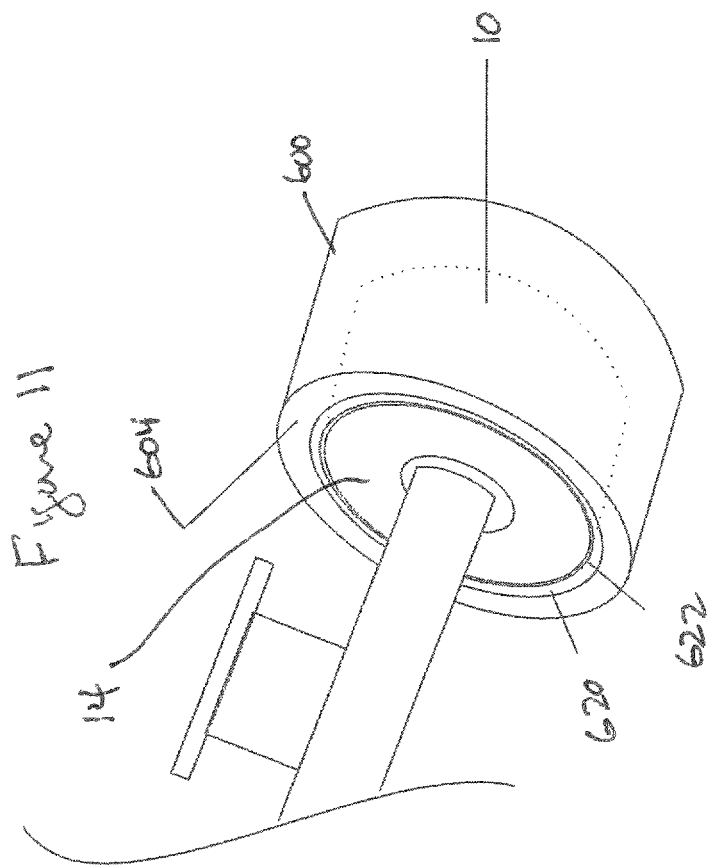

WHEEL COVER

RELATED APPLICATIONS

This application is a continuation in part application of U.S. application Ser. No. 13/225,196 filed Sep. 2, 2011, which also claims the benefit of, and priority to, U.S. Provisional Patent Application 61/379,623 filed Sep. 2, 2010. The entirety of the aforementioned applications are incorporated by reference herein.

FIELD OF THE INVENTION

This invention relates generally to skateboards. The invention more particularly relates to covers for skateboard wheels.

BACKGROUND OF THE INVENTION

A typical skateboard wheel is a hard urethane wheel in a small size diameter (e.g., 53 mm, 55 mm or similar) for a greater ease of performing skateboard maneuvers. While great for tricks and maneuvers, a small and hard set of wheels is not an efficient means of transportation beyond the local skating area. Street skateboard wheels are hard, noisy and slow when encountering rough terrain and can be challenging to control if riding in an area with small pebbles or debris.

Multiple models of skateboard wheels are available, including wheels that are softer than typical street skateboard wheels. However, obtaining the benefits of these softer wheels requires removing the other wheels and replacing them—a time consuming project.

Therefore, it would be desirable to provide an apparatus and method that overcomes the aforementioned and other disadvantages.

BRIEF DESCRIPTION OF THE DRAWINGS

The figures illustrate a number of views of the invention.
FIGS. 9A through 9D illustrate an alternative wheel cover in accordance with one embodiment of the present invention;
FIGS. 10 and 11 illustrate the wheel cover from FIGS. 9A through 9D as it would be applied to a wheel on a skateboard.

DETAILED DESCRIPTION OF THE INVENTION

Figure 1:
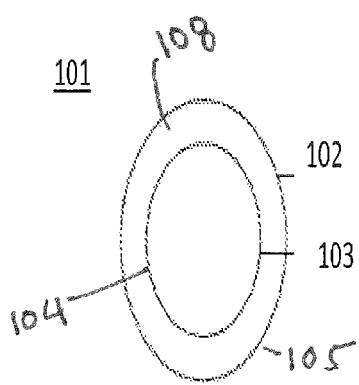
FIG. 1 illustrates a side view of an attachment unit, in accordance with one aspect of the invention.

In general, the invention provides, as seen in FIG. 1, a slip-on attachment unit 101 that will engage the periphery of the wheels of a skateboard or other wheeled activity vehicles to convert the surface contacting portion of the wheels into a different wheel durometer. By slipping on the cover 101, the wheels will be adapted for use on rougher terrain and also allow the user to ride the same or similar terrain as they do with typical skateboard wheels in a faster, smoother, quieter manner. The slip-on attachment unit comprises in general a generally hollow cylindrical attachment member 102 which is adapted to fit over and frictionally engage the ground contacting periphery of the conventional skateboard wheels 10 with an interior surface 103. In preferred embodiments, the wheel 10 will not be restrained from rotation about its related axle. Furthermore, the design and construction of the slip-on attachment unit will allow a skateboard to be converted quickly without removing the wheels from the skateboard and without any particular degree of manual dexterity. Conversely, the skateboard may be returned to its normal configuration in a like manner and without a great deal of physical exertion.

In particular, FIG. 1 illustrates that the wheel cover 101 includes a substantially cylindrical profile including a circumferential lip 104 along one end of the cylinder 108 (the end diametrically opposed to the skateboard, i.e. the outside end 12) and attachment members (FIG. 3, etc) on the other end of the cylinder 106 (the end facing or towards the skateboard, i.e. the inside end 14) positioned about the circumferential ridge 109 of the cylinder end 106.

The material for the cover is, in one embodiment, a softer durometer than the relatively hard durometer of many skateboard wheels. In such embodiments, the material is more flexible and allows the cover to 'slide' over the wheel by rotating or bending the attachment members out of the way, slipping the cover over the wheel, and allowing the attachment members to resume their preferred position. In other embodiments, the material for the cover is a harder durometer than the skate wheel, while in yet other embodiments, the wheel cover includes at least a first and second layer of differing durometers.

In particular, FIG. 1 illustrates a side view of wheel cover 101 and inner surface 103 and outer surface 105. Inner surface 103 contacts an exterior surface of the wheel in a friction fit such that the inner surface 103 mates tightly with the exterior surface of the wheel. Outer surface 105 then contacts the ground while the skateboard is in operation.

Figure 2:
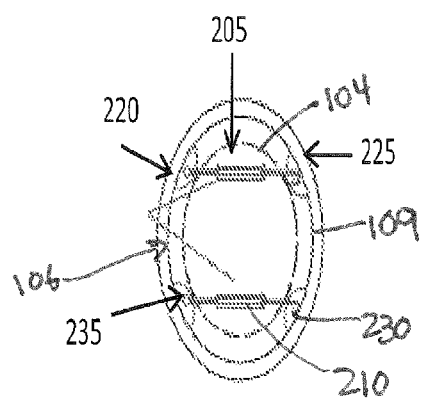
FIG. 2 illustrates a side view of an attachment unit, in accordance with another aspect of the invention.
Figure 3:
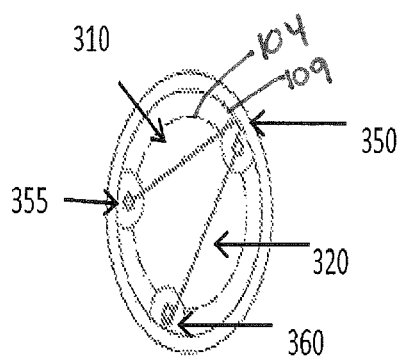
FIG. 3 illustrates a side view of an attachment unit, in accordance with another aspect of the invention.
Figure 4:
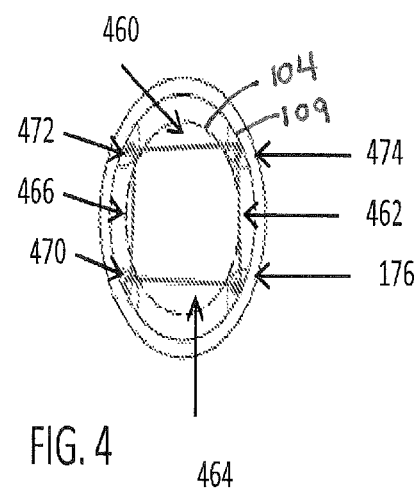
FIG. 4 illustrates a side view of an attachment unit, in accordance with another aspect of the invention.

FIG. 2 illustrates an embodiment of the invention including a plurality of attachment devices disposed around a periphery of the wheel cover. As seen in FIG. 2, two attachment members 205, 210 stretch between opposing chords and attachment points 220, 225, 230, 235 of the periphery of the wheel cover and secure the wheel cover to the wheel and reduce the incidence of slipping from the wheel. Although two attachment members are illustrated in FIG. 2, any number may be used. FIG. 3 illustrates another embodiment, wherein two attachment members 310, 320 extend between only three attachment points 350, 355, 360. FIG. 4 illustrates four attachment members 460, 462, 464, 468 extending between four attachment points 470, 472, 474, 476.

In one embodiment, three attachment devices are incorporated around the circumference of the cylinder. In one such embodiment, the three attachment devices are positioned approximately equal distances from each other. In another such embodiment, the first attachment device is offset from the second attachment device by a first distance, the first attachment device is offset from the third attachment device by the first distance, and the second attachment device is offset from the third attachment device by a second distance, such that the first distance is not equal to the second distance. In other embodiments, 4 attachment devices are incorporated around the circumference such that a first attachment device is offset from a second attachment device by a first distance, a third attachment device is offset from a fourth attachment device by the first difference, and the first attachment device is offset from the third attachment device by a second distance and the second attachment device is offset from the fourth attachment device by the second distance, and the first distance is different than the second distance. In other 4 attachment device embodiments, each attachment device is offset from the neighboring attachment devices by the same distance.

In one embodiment, the attachment devices include a hole or other such fastener, for connecting a first attachment device and second attachment device with a connecting device. The connecting device may be a thread or string, a metallic hook, or other such retaining device. The connecting device may snap on using a snap, hook-and-latch fastener, zipper, or the like. The connecting device may attach between two attachment devices, or multiple connecting devices can attach between multiple attachment devices. The connecting device is made of any material intended to resist the rotation of the attachment device away from the connecting device itself. The connecting device may resist the wheel unintentionally being separated from the cover. Multiple connecting devices may attach to an individual attachment device in certain embodiments.

In yet other embodiments, the attachment device may include a spring loaded metallic pin that retracts to allow placement of the cover over a wheel, and upon placement extend to lock the cover over the wheel. Alternatively, other devices to lockingly engage a metallic pin, such as retracting latches may be used. In yet other embodiments, the attachment device includes a pin or spike that extends into a wheel well of the wheel itself.

In yet other embodiments, the connecting device includes a rubber, or other such flexible material, band extending between attachment devices.

In another embodiment, the cover includes at least a first rib. The rib may be positioned circumferentially perpendicular to an axis defined by the cylinder. Alternatively, or additionally, the rib may be circumferential and parallel with an axis defined by the cylinder. The rib may be formed from any appropriate material such as a polymer, metal, or the like.

Figures 5A, 5B, 5C:
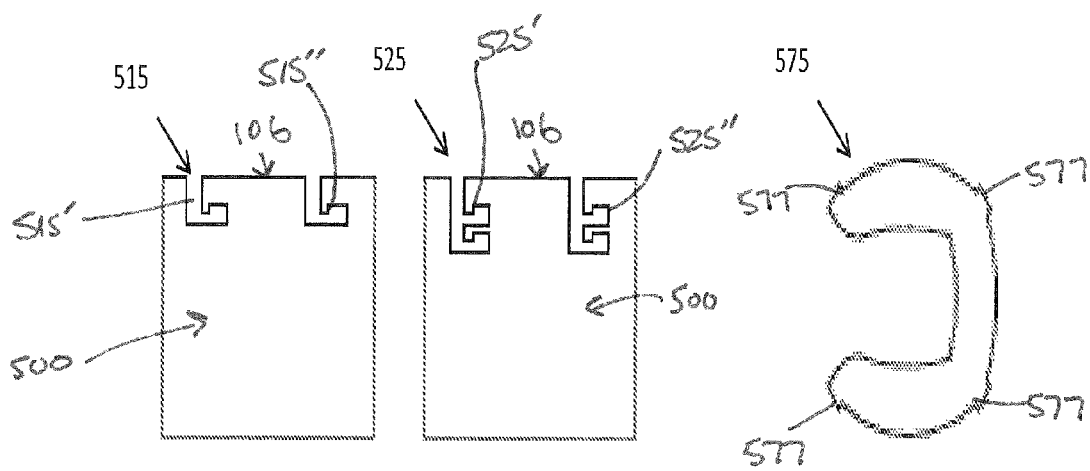
FIG. 5A, 5B, 5C illustrates a side view of an attachment unit, in accordance with another aspect of the invention.
Figure 6:
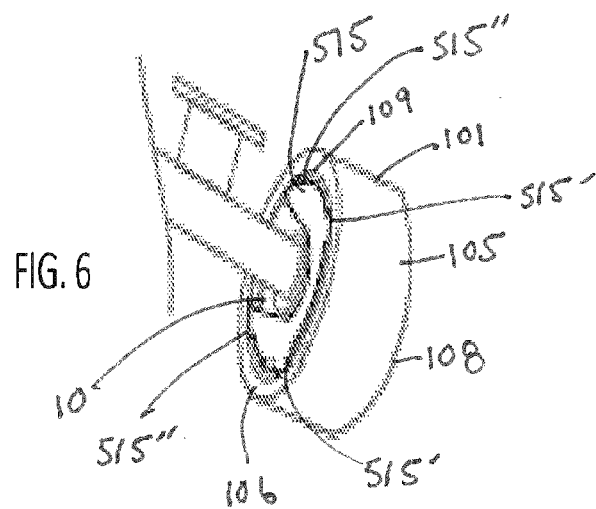
FIG. 6 illustrates a perspective view of an attachment unit, in accordance with another aspect of the invention.

FIGS. 5A, 5B, and 5C illustrate another embodiment of the invention, wherein the invention comprises a system. FIGS. 5A and 5B illustrate an embodiment of the wheel cover wherein the outer periphery 106 of the wheel cover 500 includes a notch 515, 525—as illustrated a first notch 515', 525' and a second notch 515", 525". The notch can assume any number of design variations, examples of which are illustrated in FIG. 5A and FIG. B. FIG. 5C illustrates an embodiment of a substantially rigid connector 575 having projecting flanges 577 shaped to mate with at least the first notch and second notch, wherein the substantially rigid connector 575 occupies at least a portion of the area defined by the circumferential ridge 109 of the cylinder end 106. Also, as illustrated the first notch and second notch in each illustration includes a similar design, although this is not required by the invention. As seen in FIG. 5A and FIG. 5B, there are only two notches illustrated, although any number of notches may be used. FIG. 6 illustrates the system of FIGS. 5A, 5B and 5C disposed on a wheel with an axle, and includes four notches. The substantially rigid connector 575 illustrated in FIG. 5C comprises a "c" shape although other shapes are possible. The substantially rigid connector 575 may be made from any material sufficiently rigid to resist bending, but in one embodiment is made from steel.

Figure 7:
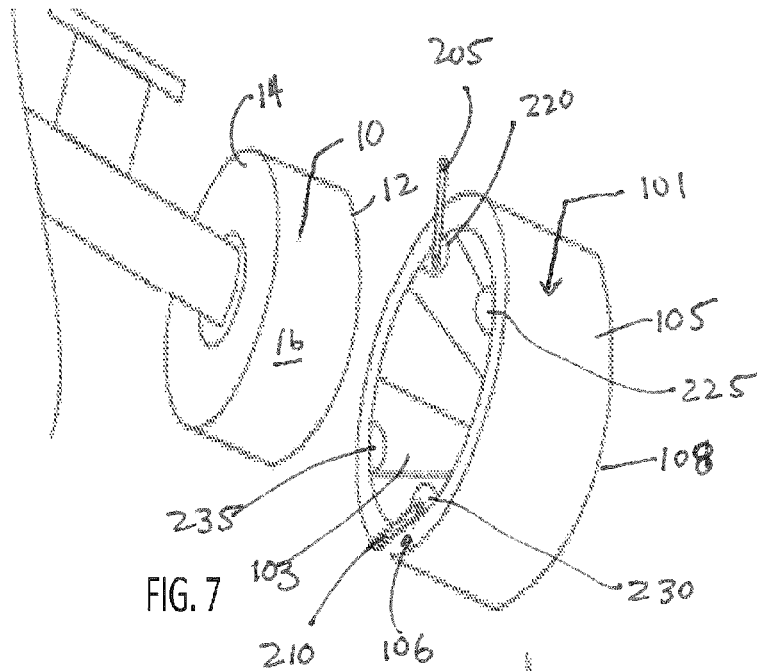
FIGS. 7 and 8 illustrate perspective views of attachment units, in accordance with another aspect of the invention.
Figure 8:
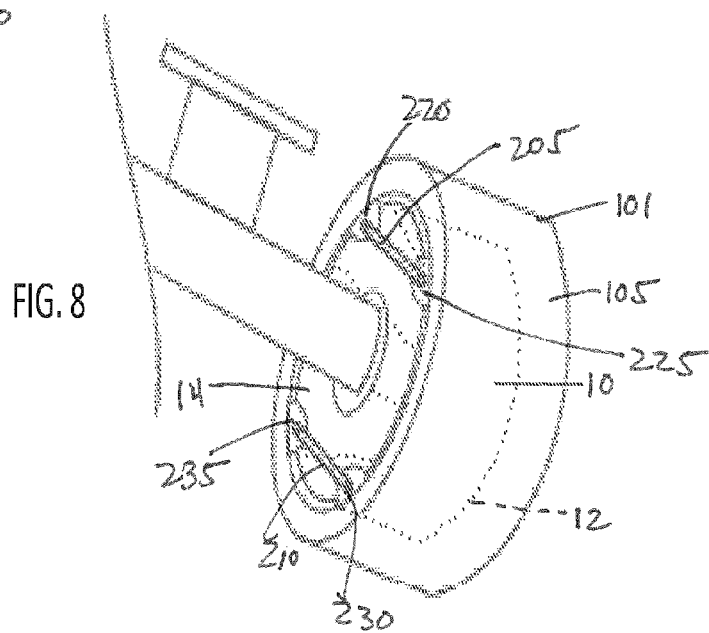
Figure 10:
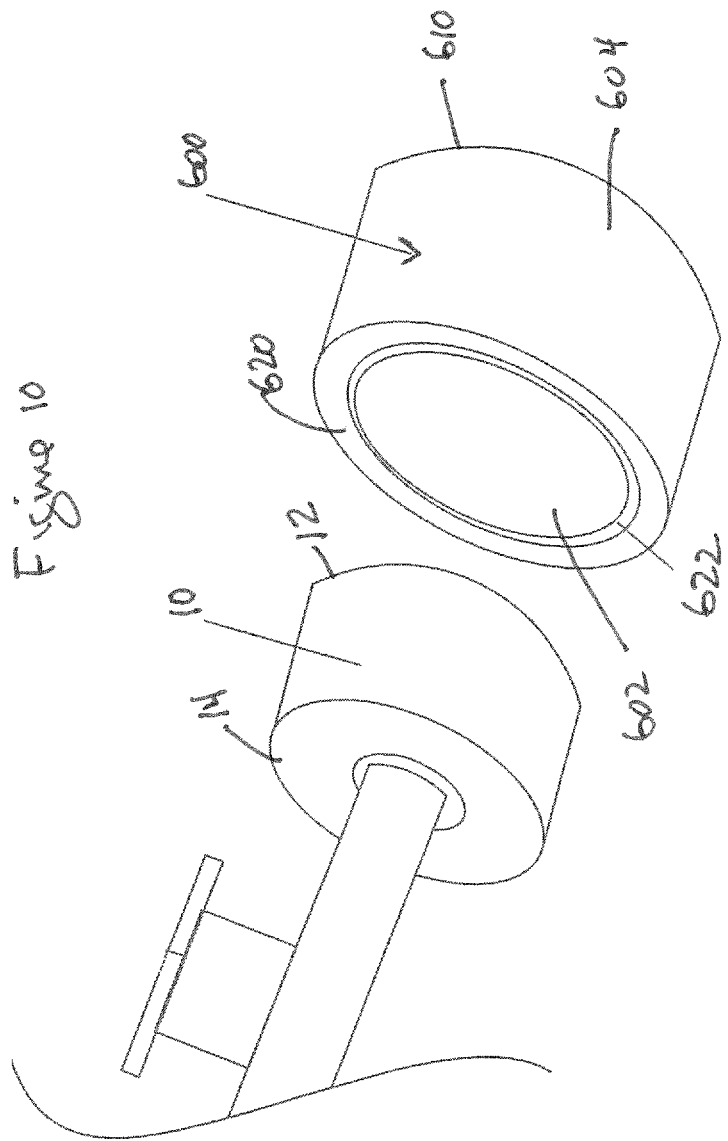

FIG. 7 and FIG. 8 graphically illustrate a method of attaching the wheel cover in accordance with FIGS. 1-4. FIG. 7 illustrates the wheel cover distant from the wheel, whereas the wheel cover is surrounding and attached to the wheel in FIG. 8.

In one embodiment, three attachment devices are incorporated around the circumference of the cylinder. In one such embodiment, the three attachment devices are positioned approximately equal distances from each other. In another such embodiment, the first attachment device is offset from the second attachment device by a first distance, the first attachment device is offset from the third attachment device by the first distance, and the second attachment device is offset from the third attachment device by a second distance, such that the first distance is not equal to the second distance. In other embodiments, 4 attachment devices are incorporated around the circumference such that a first attachment device is offset from a second attachment device by a first distance, a third attachment device is offset from a fourth attachment device by the first difference, and the first attachment device is offset from the third attachment device by a second distance and the second attachment device is offset from the fourth attachment device by the second distance, and the first distance is different than the second distance. In other 4 attachment device embodiments, each attachment device is offset from the neighboring attachment devices by the same distance.

In one embodiment, the attachment devices include a hole or other such fastener, for connecting a first attachment device and second attachment device with a connecting device. The connecting device may be a thread or string, a metallic hook, or other such retaining device. The connecting device may snap on using a snap, hook-and-latch fastener, zipper, or the like. The connecting device may attach between two attachment devices, or multiple connecting devices can attach between multiple attachment devices. The connecting device is made of any material intended to resist the rotation of the attachment device away from the connecting device itself. The connecting device may resist the wheel unintentionally being separated from the cover. Multiple connecting devices may attach to an individual attachment device in certain embodiments.

In yet other embodiments, the attachment device may include a spring loaded metallic pin that retracts to allow placement of the cover over a wheel, and upon placement extend to lock the cover over the wheel. Alternatively, other devices to lockingly engage a metallic pin, such as retracting latches may be used. In yet other embodiments, the attachment device includes a pin or spike that extends into a wheel well of the wheel itself.

In yet other embodiments, the connecting device includes a rubber, or other such flexible material, band extending between attachment devices.

In another embodiment, the cover includes at least a first rib. The rib may be positioned circumferentially perpendicular to an axis defined by the cylinder. Alternatively, or additionally, the rib may be circumferential and parallel with an axis defined by the cylinder. The rib may be formed from any appropriate material such as a polymer, metal, or the like.

Thus, the wheel cover includes an outer portion for contacting the ground, an inner portion for contacting the wheel, a lip for covering a radial portion of an outer part of the wheel, and at least one attachment device to releasably attach the cover to the wheel.

The sizing of the wheel cover is a function of the size of the wheel to be attached to, and a number of sizes are anticipated. Often skateboard wheels typically extend between about 40-70 mm, but this should not be construed as a limitation or an element of the claims.

Referring now to FIGS. 9A-11, there is provided another embodiment of the present invention, illustrating a wheel cover 600 having an inner core 602 and an outer core 604. The inner core 602 is an urethane core material that is capable of riding on the outer surface 16 of the wheel 10. The outer core 604 is also an urethane composite but is made of a softer urethane material then the inner core 602. The softer outer core 604 will provide for an outer surface 606 allow for a smoother ride of uneven terrain.

The wheel cover 600 typically includes a generally cylindrical profile and includes a circumferential lip 614 along one end of the cylinder 610 (the end diametrically opposed to the skateboard, i.e. the outside end 12). The lip 614 extends radially inwardly towards the center of axis and for a distance that ensures the that the wheel 10 does not slip our of the outside cylinder end 610. The inside cylinder end 620 includes a circumferential rim 622 extending radially inwardly towards the center of axis for a distance that once the wheel 10 is placed in the wheel cover, the wheel 10 is captured between the circumferential lip 614 and circumferential rim 622. In one embodiment the circumferential rim 622 is made from a medium urethane material that permits a user to bend or flex the rim to permits the wheel cover 600 to slide over the wheel. Once the circumferential rim 622 is over the insider edge 14 of the wheel 10, the circumferential rim 622 naturally bends or flexes back to its original form.

In one aspect the wheel cover 600 includes an inner diameter sized to accommodate various wheel sizes. As such in one aspect the inner diameter of the wheel cover may be sized such that a larger wheel size may have a frictional fit between the inside surface of the wheel cover and the outside surface of the wheel. Alternatively, for small wheel sizes, the wheel cover may have a small give of about 1-3 mm, such that there may not be one hundred percent contact between the inside surface of the wheel cover and the outside surface of the wheel at all times.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

We claim:

1. A wheel cover for a skateboard wheel, the skateboard wheel having a durometer, the wheel cover comprising:
    a removable wheel cover having an integral outer surface and an integral inner surface, the removable wheel cover further having an outside edge and an inside edge, and the outer surface being comprised of a material with a first durometer different than the durometer of the wheel;
    a circumferential lip extending radially inwardly from the outside edge; and
    a circumferential rim extending radially inwardly from the inside edge, such that when the removable wheel cover is placed over a skateboard wheel, the circumferential lip extends over an outside portion of the wheel and circumferential rim extends over an inside portion of the wheel thereby capturing the skateboard wheel between the circumferential lip and the circumferential rim, and wherein the inner surface is comprised of a material with a second durometer that is harder than the first durometer, and wherein at least the circumferential rim is made of a material that is configured to permit the circumferential rim to flex and bend over the skateboard wheel when placing or removing the removably wheel cover from the skateboard wheel.

2. The wheel cover of claim 1, wherein the circumferential rim is comprised of a material that tends to return the circumferential ridge to an original form when bent or flexed during placement or removal of the wheel cover over the skateboard wheel.

3. The wheel cover of claim 2, wherein the inner surface is comprised of a material with a second durometer, and the second durometer is harder than the first durometer.

* * * * *